United States Patent [19]

Berger et al.

[11] Patent Number: 5,183,703
[45] Date of Patent: Feb. 2, 1993

[54] BELT STRAP FOR SAFETY BELTS

[75] Inventors: Johann Berger, Obere Schloss-Strasse 114, D-7077 Aldorf; Josef Berger, Schwäb. Gmünd-Grossdeinbach, both of Fed. Rep. of Germany

[73] Assignee: Johann Berger, Alfdorf, Fed. Rep. of Germany

[21] Appl. No.: 545,651

[22] Filed: Jun. 29, 1990

[30] Foreign Application Priority Data

Jun. 30, 1989 [EP] European Pat. Off. ........ 89111896.0

[51] Int. Cl.⁵ .................................. D03D 15/00
[52] U.S. Cl. ...................................... 428/292; 428/225; 428/227; 428/232; 428/272; 428/293; 428/362; 428/369; 428/303; 180/268; 182/3; 182/7; 182/231; 139/383 R
[58] Field of Search ............... 180/268; 182/3, 7, 231; 428/225, 227, 232, 272, 292, 293, 362, 303, 369; 139/383 R

[56] References Cited

U.S. PATENT DOCUMENTS

| 3,707,120 | 12/1972 | Schroeder | 428/273 |
| 3,855,678 | 12/1974 | Schroeder | 428/273 |
| 3,861,744 | 1/1975 | Yamada et al. | 139/383 R |
| 3,872,895 | 3/1975 | Takada | 139/383 R |
| 3,926,227 | 12/1975 | Takada et al. | 139/383 R |
| 4,313,473 | 2/1982 | Reiter | 139/383 R |
| 4,421,708 | 12/1983 | Reichardt et al. | 528/502 |
| 4,660,605 | 4/1987 | Koch | 139/383 R |
| 4,710,423 | 12/1987 | Imamura | 428/272 |
| 4,800,929 | 1/1989 | Watanabe | 139/383 R |

Primary Examiner—George F. Lesmes
Assistant Examiner—Beverly A. Pawlikowski
Attorney, Agent, or Firm—Longacre & White

[57] ABSTRACT

A belt strap (1) for safety belts which is to have outer surfaces of as low friction as possible so that it can run through the safety belt system with as little friction as possible. The warp threads (3), which are woven into the belt strap, have filaments (5) of at least 15 dtex, particularly 17 dtex. The warp threads (3) are, in one embodiment, untwined and tangled at certain points with compressed air, whereby the tangled points (7) can be spaced from one another by 5 to 15 cm. In another embodiment the warp threads are twined only slightly, namely with 30 to 50 twists per meter thread length.

4 Claims, 1 Drawing Sheet

BELT STRAP FOR SAFETY BELTS

BACKGROUND OF THE INVENTION

1. Field of the Invention

The invention relates to a belt strap for safety belts for vehicles, particularly motor vehicles. The belt strap should have as low friction an outer surface as possible so that it can run through the safety belt system, i.e. the coiling device, past the guide fitting at the top of the bodywork and past the insertion fitting at the bottom with as little friction as possible. Such straps are also referred to in the technical terminology as "low-friction straps". The lower the friction the higher is the proportion of the force of the coiling spring which may be used for tensioning and coiling. With belt straps of very low friction a weaker spring can be provided than is otherwise usual. Less pressure is advantageously exerted by it on the body of the person secured than by previously usual springs. The wearing comfort of the safety belt is thus increased.

A lower friction of the belt straps is also of importance at low outdoor temperatures. The coiling spring which comprises spring steel becomes harder at lower temperatures and can only exert a lesser tension on the belt strap. The belt strap also becomes harder and performs more flexural work at the point where it must bend, principally around the guide fitting. This can result in the belt strap not being completely wound up when it is taken off so that a portion of the belt strap hangs out of the door opening. If the driver does not notice this he can shut a loop of the belt strap in the door. The belt strap can be damaged by this, particularly when it is pinched in the region of the door lock. On the other hand, there is the danger that after taking off the belt strap the driver treads into a hanging loop of the belt strap when getting out and thus damages the belt strap and possibly also injures himself.

2. Description of Related Art

It is known to make belt straps of low friction by applying a coating (Avivage) namely a chemical product which adheres to the outer surface of the belt strap and reduces the friction. The disadvantage of this known method is that the coating is partially worn away after some time of use and no longer fulfils its purpose of making the strap of low friction. The coating can also be destroyed by chemical environmental effects.

Belt straps which are supplied for use in motor vehicles must pass an abrasion test which is determined by U.S. Standard MVSS, No. 209 (para. 571.209). (Published in USA Federal Register, Volume 36, No. 232, dated Dec. 2, 1971). In accordance with this Standard a belt strap is firstly subjected to an abrasion test. It is subsequently stretched to breaking and the breaking load is determined. This must be at least 75 to 85% of the original breaking load. The belt strap is otherwise not permitted by the competent national authorities to be used as a safety belt in motor vehicles.

A belt strap which has lost its coating is weakened by abrasion in an impermissibly short time to the extent that it no longer has the necessary minimum breaking load. The safety of the user is then no longer guaranteed.

Belt straps are known whose filaments have 8 to 14 dtex. In order that these pass the abrasion test either a coating is necessary, which has the disadvantages referred to above, or a twining of 80 to 100 twists per meter.

SUMMARY OF THE INVENTION

A belt strap is to be provided by the present invention which remains of low friction for its entire service life and in which the use of a coating is superfluous. This object is solved in two different manners.

The essential element of both solutions is to manufacture the warp threads, from which the belt strap is woven, with the use of relatively thick filaments and accordingly to use less filaments than was previously conventional. The advantageous effects occur with filaments of only 15 dtex. (dezitex=weight of the filaments in grams per 10,000 m length). Since a coating need no longer be applied, its costs are saved.

In order to solve the object one or other of the two following features is also necessary:

In one embodiment, the warp threads remain untwined. This has the important advantage that the belt strap woven from them has a particularly high bending stiffness. This belt strap has to a certain extent a high "bounce force". If one folds back an end portion of such a strap it springs back substantially more powerfully and rapidly than is the case with a strap of twined warp threads.

In the first embodiment, the warp threads are also disordered at certain points with compressed air or "tangled" in the technical terminology. The cohesion of the filaments of the warp threads is thus increased which is important for the weaving process. The friction of the threads is not increased by the air tangling so that particularly low-friction belt straps can be produced with untwined and air-tangled threads. This solution has the advantage that the expense of the twining process can be saved.

In a second embodiment the warp threads, which also have filaments of at least 15 dtex, are twined with only 30 to 50 twists per meter length of thread. The friction of the belt strap may be reduced in this manner also. The twining, which is still only slight, has the effect of tying in the individual filaments which is crucial for the weaving process. By comparison with the first mentioned solution of using untwined warp threads tangled at certain points with compressed air, slightly increased costs are incurred in the second mentioned solution due to the twining. These are however maintained small due to the low number of twists per meter length of the fibers.

Belt straps of higher longitudinal stiffness are produced with untwined and air-tangled warp threads and also with less twined warp threads without air-tangling. Two advantageous effects are thereby produced:

less flexural work, i.e. frictional work when running round the fittings and a shorter engagement surface in the peripheral direction at the guide fitting, thus again less friction.

Further features of the invention will be apparent from the claims.

When using the first mentioned solution, the points at which the warp threads are tangled can be spaced from one another by 5 to 15 cm.

A particularly low-friction and abrasion resistant, in accordance with the U.S. Standard referred to above, straps are produced with both solutions if the warp threads have filaments of 16 to 22 dtex. With even thicker filaments the breaking load would be too low. Filaments of 17 dtex are particularly favourable.

Exemplary embodiments with further features of the invention will be described below with reference to the drawings.

DESCRIPTION OF THE PREFERRED EMBODIMENTS

Figure 1:
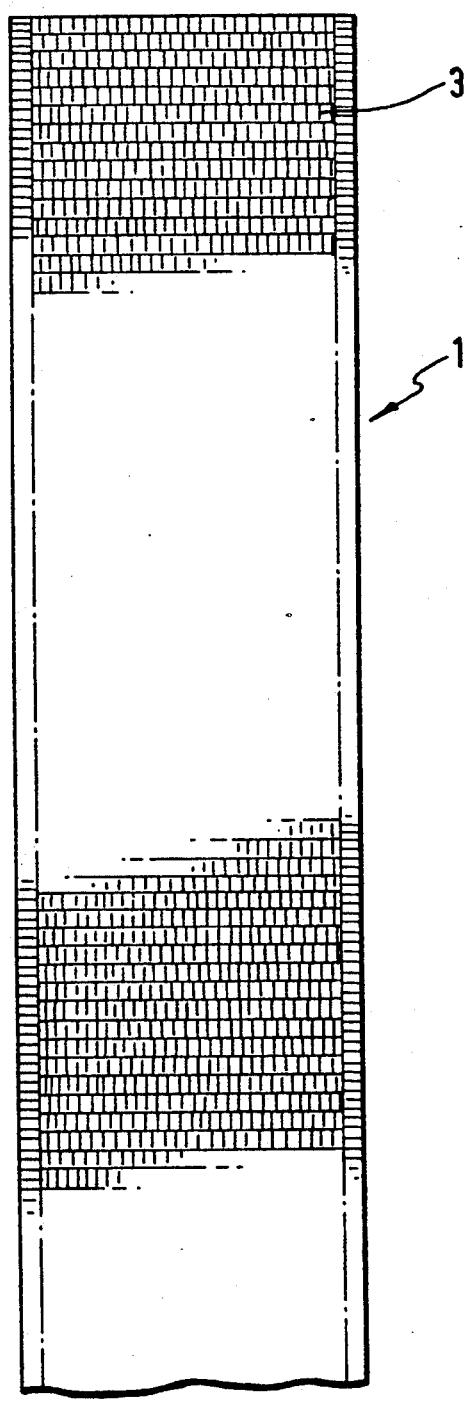
FIG. 1 shows a portion of a belt strap in plan view.

FIG. 1 shows a portion of a belt strap 1 with its warp threads 3. The illustrated structure is produced in a manner known per se by the manner of weaving. The entire surface of the belt strap is formed by warp threads 3 whilst the weft threads are completely hidden in the interior of the fabric.

Figure 2:
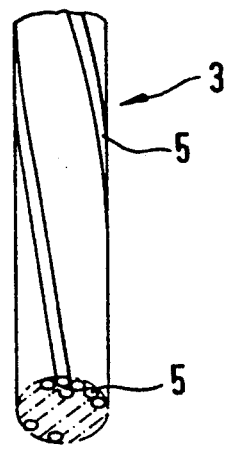
FIG. 2 is a highly schematic view of a warp thread in accordance with one embodiment of the invention, with the upper portion in elevation and the lower portion in cross-section.

FIG. 2 shows a portion of one of the warp threads 3 in which two capillaries (=filaments) 5 are shown in a highly schematic manner in the upper portion which, as can be seen, are relatively thick relative to the diameter of the entire warp thread 3. A few filaments 5 are shown at the lower end in cross-section. The filaments 5 have a thickness of at least 15, particularly 17, dtex. (dezitex=weight of the filaments in grams per 10,000 m length). The filaments are twined to only a very small extent, namely with 30 to 50 twists per meter.

Figure 3:
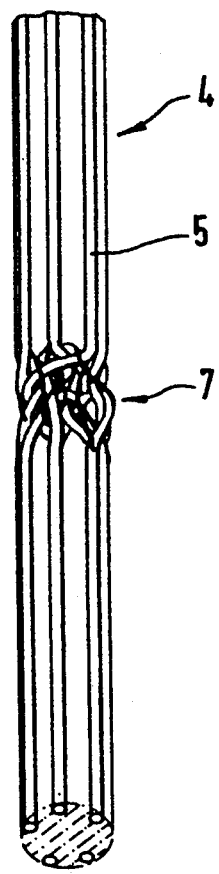
FIG. 3 is a similar view of a warp thread in accordance with another embodiment of the invention.

FIG. 3 shows an untwined warp thread 4 which has filaments 5 extending parallel to one another, as shown at the top and at the bottom. The filaments are tangled with one another by compressed air in a region 7 of the warp thread, whereby the filaments are bound to one another. Such regions are situated every 5 to 15 cm in the longitudinal direction of the warp thread 4.

The belt strap is woven in a manner known per se from warp threads as shown in FIG. 2 or, particularly, as shown in FIG. 3. A belt strap is thus produced—particularly when using untwined threads—with a higher longitudinal stiffness than was previously usual which performs less flexural or milling work when running around the fittings.

This flexural work results from the fact that when bent around a fitting the outer regions of the belt strap are stretched and the inner regions are compressed. This results in frictional work and thus in a higher resistance to the tensional force of the coiling spring.

Belt straps of higher longitudinal stiffness in accordance with the invention engage a web of a fitting around which they are to run over a shorter portion of their longitudinal direction than conventional belt straps. The flexural work is thus reduced and the coiling spring relieved.

The manufacture and the frictional properties of the weft thread are not of significance in this case since the weft thread is hidden within the fabric.

The belt strap is further processed in the usual manner. No coating is applied.

Whilst the belt strap becomes worn after abrasion or chemical destruction of a coating of conventional type and its breaking load can thus be reduced to an impermissibly low value, a belt strap in accordance with the invention remains of low friction even without a coating and becomes worn only to an extent which lies far below the permissible threshold value set by the U.S. Standard referred to above.

I claim:

1. A low friction woven belt strap for a safety belt, comprising warp threads made up of individual filaments of at least 15 dtex, said filaments of each thread being substantially parallel at various first regions of the thread but entangled together at various second regions spaced longitudinally of each thread.

2. A belt strap according to claim 1 wherein said points where said filaments are entangled together result from the application of compressed air.

3. A belt strap according to claim 1 wherein said warp threads are made up of filaments of 16 to 22 dtex.

4. A belt strap according to claim 3 wherein said warp threads are made up of filaments of about 17 dtex.

* * * * *